(12) United States Patent
Kamino

(10) Patent No.: US 9,233,291 B2
(45) Date of Patent: Jan. 12, 2016

(54) MEASURING APPARATUS FOR GOLF CLUB

(71) Applicant: DUNLOP SPORTS CO. LTD., Kobe-shi, Hyogo (JP)

(72) Inventor: Kazuya Kamino, Kobe (JP)

(73) Assignee: Dunlop Sports Co. Ltd., Kobe-shi (JP)

( * ) Notice: Subject to any disclaimer, the term of this patent is extended or adjusted under 35 U.S.C. 154(b) by 0 days.

(21) Appl. No.: 13/742,833

(22) Filed: Jan. 16, 2013

(65) Prior Publication Data
US 2013/0196783 A1    Aug. 1, 2013

(30) Foreign Application Priority Data
Jan. 27, 2012    (JP) .................. 2012-014761

(51) Int. Cl.
| A63F 9/24 | (2006.01) |
| A63F 13/00 | (2014.01) |
| G06F 17/00 | (2006.01) |
| G06F 19/00 | (2011.01) |
| A63B 69/36 | (2006.01) |
| A63F 7/06 | (2006.01) |
| H04N 5/232 | (2006.01) |
| G06T 1/00 | (2006.01) |

(52) U.S. Cl.
CPC ........... *A63B 69/3658* (2013.01); *A63F 7/0628* (2013.01); *G06T 1/0007* (2013.01); *H04N 5/23222* (2013.01); *A63F 7/06* (2013.01)

(58) Field of Classification Search
CPC ....... A63F 7/06; A63F 7/0628; A63F 7/0672; A63F 7/0684; A63B 69/3658; H04N 5/23222

USPC ...................... 463/36–38; 473/219
See application file for complete search history.

(56) References Cited

U.S. PATENT DOCUMENTS

| 6,042,483 | A | 3/2000 | Katayama |
| 6,821,211 | B2 * | 11/2004 | Otten et al. .................. 473/219 |
| 7,744,480 | B2 * | 6/2010 | Gobush .......................... 473/219 |
| 2006/0030432 | A1 | 2/2006 | Katayama |

FOREIGN PATENT DOCUMENTS

| JP | 9-215807 A | 8/1997 |
| JP | 2000-66315 A | 3/2000 |
| JP | 2005-34619 A | 2/2005 |

* cited by examiner

*Primary Examiner* — Milap Shah
*Assistant Examiner* — Jason Pinheiro
(74) *Attorney, Agent, or Firm* — Birch, Stewart, Kolasch & Birch, LLP

(57) ABSTRACT

A measuring apparatus 10 for a golf club 34 includes: a club camera 20 capable of photographing the golf club; a control part 30 capable of controlling a timing at which the golf club is photographed; and three sensors capable of detecting passage of the golf club 34. The three sensors are defined as a first sensor S1, a second sensor S2, and a third sensor S3 in this order from a point close to a position of a golf ball. When a club speed calculated based on the passage of the golf club detected by the second sensor S2 and the third sensor S3 is equal to or greater than a predetermined threshold value, the control part generates a trigger signal for starting to photograph the golf club. The measuring apparatus 10 can effectively suppress erroneous generation of the trigger signal.

14 Claims, 7 Drawing Sheets

MEASURING APPARATUS FOR GOLF CLUB

The present application claims priority on Patent Application No. 2012-014761 filed in JAPAN on Jan. 27, 2012, the entire contents of which are hereby incorporated by reference.

BACKGROUND OF THE INVENTION

1. Field of the Invention

The present invention relates to a measuring apparatus for a golf club.

2. Description of the Related Art

An apparatus capable of measuring the behavior of a golf club or a golf ball has been known.

Japanese Patent Application Laid-Open No. 2006-43239 (US2006-0030432) discloses an apparatus measuring a golf ball. The apparatus has a sensor part sending a trigger signal determining a photographing timing of the golf ball. The sensor part includes two optical sensors. Japanese Patent Application Laid-Open No. 10-186474 (U.S. Pat. No. 6,042, 483) also discloses the same apparatus as that of Japanese Patent Application Laid-Open No. 2006-43239.

Japanese Patent Application Laid-Open No. 2005-34619 discloses an apparatus for measuring the behavior of a head. In the apparatus, the behavior of the head is measured by utilizing a marker provided on the head or the like.

Japanese Patent Application Laid-Open No. 2000-66315 discloses an apparatus measuring the behavior of a golf club utilizing an image. In the apparatus, two sensors are used. When a first sensor detects passage of a head, a trigger output acts. A head speed is calculated based on a distance between the first sensor and a second sensor.

Japanese Patent Application Laid-Open No. 9-215807 discloses a swing behavior measuring apparatus which analyzes a head behavior using an image obtained by continuous stroboscopic photographing.

SUMMARY OF THE INVENTION

A new problem unsolvable in the conventional technique was found. When a swing is measured, a golfer performs a so-called waggle in an address in many cases. The waggle is an action for lightly moving a head from side to side in the address. The motion of the head according to the waggle can be detected by a sensor provided to generate the trigger signal. An unsuitable trigger signal is generated by the detection. In order to avoid the unsuitable trigger signal, for example, it is necessary to manually send the trigger signal without using the sensor. The manually sent trigger signal increases labor and time for measurement to deteriorate the convenience of the measurement.

It is an object of the present invention to provide a measuring apparatus for a golf club which reduces a measurement error and has high convenience.

A measuring apparatus for a golf club according to the present invention includes: a club camera capable of photographing the golf club; a control part capable of controlling a timing at which the golf club is photographed; and three sensors capable of detecting passage of the golf club. The three sensors are defined as a first sensor, a second sensor, and a third sensor in this order from a point close to a position of a golf ball. In this case, when a club speed calculated based on the passage of the golf club detected by the second sensor and the third sensor is equal to or greater than a predetermined threshold value, the control part generates a trigger signal for starting to photograph the golf club.

Preferably, a head moving distance Dh is calculated based on a head position when the second sensor detects the passage of the golf club and a head position when the first sensor detects the passage of the golf club; and a head speed is calculated based on the head moving distance Dh.

Preferably, the measuring apparatus further includes an information processing part capable of calculating a head speed. When a time at which the club is detected by the second sensor is defined as T2; a time at which the club is detected by the first sensor is defined as T1; a time period between the time T2 and the time T1 is defined as T12; a head image at the time T1 is defined as H1; a head image at the time T2 is defined as H2; and a head moving distance obtained from the image H1 and the image H2 is defined as Dh. At this time, the information processing part calculates the head speed based on the head moving distance Dh and the time T12.

Preferably, at least two sensors which are adjacent to each other in the three sensors are light emitting/receiving sensors. Preferably, directions of emitted lights of the two sensors are opposite to each other. Preferably, the two light emitting/receiving sensors are the second sensor and the third sensor.

Preferably, the three sensors are light emitting/receiving sensors. Preferably, directions of emitted lights of the first sensor and the second sensor are opposite to each other. Preferably, directions of emitted lights of the second sensor and the third sensor are opposite to each other.

Preferably, the threshold value is 5 m/s or greater and 15 m/s or less.

Preferably, when a club having a mark provided on a crown of a head is used, the head moving distance Dh can be measured based on the mark.

The present invention can provide a measuring apparatus for a golf club which reduces a measurement error and has high convenience.

DESCRIPTION OF THE PREFERRED EMBODIMENTS

Hereinafter, the present invention will be described in detail based on preferred embodiments with appropriate references to the accompanying drawings.

Figure 1:
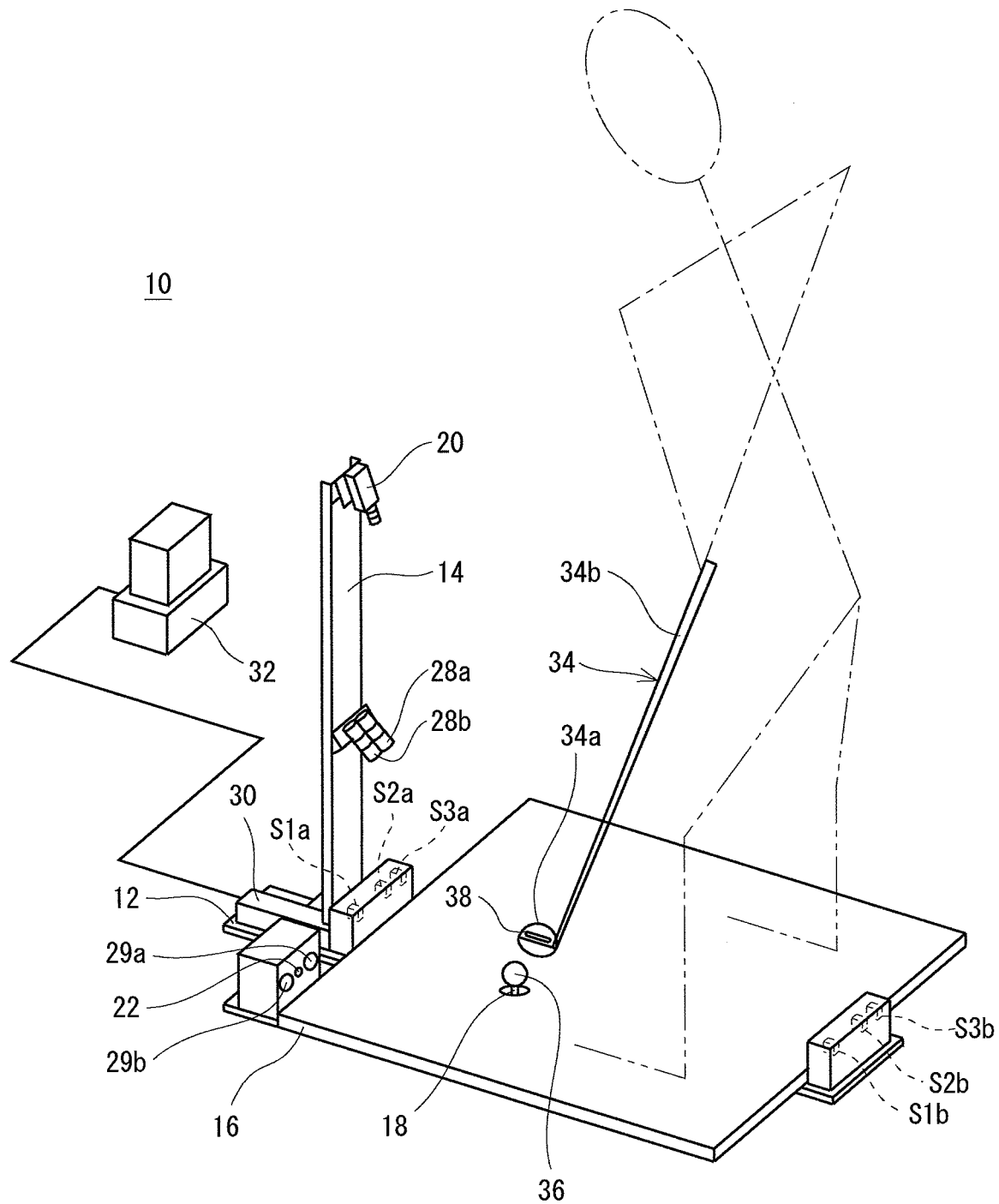
FIG. 1 is a perspective view schematically showing a measuring apparatus according to a first embodiment of the present invention.

A measuring apparatus 10 shown in FIG. 1 includes a base 12, a support rod 14, a base plate 16, a tee 18, a club camera 20, a ball camera 22, a first sensor S1 (S1a, S1b), a second sensor S2 (S2a, S2b), a third sensor S3 (S3a, S3b), a strobe light 28 (28a, 28b), a strobe light 29 (29a, 29b), a control part 30, and an information processing part 32.

A golf club 34 and a golf ball 36 are shown with the measuring apparatus 10 in FIG. 1. The golf club 34 includes a head 34a, a shaft 34b, and a grip (not shown). A right-handed golf player's address posture is shown by a two-dot chain line in FIG. 1. The golf ball 36 is launched toward the left direction of the player having the address posture. In the present application, to facilitate the description, unless particularly described, a description will be given with a lateral direction of the player having the address posture defined as a front-back direction and a front-back direction of the player defined as a lateral direction.

The support rod 14 and the base plate 16 are positioned and fixed to the base 12. The support rod 14 extends upward from the base 12. A tee 18 is positioned and mounted to the base plate 16. The club camera 20 is positioned and mounted to the upper part of the support rod 14. The ball camera 22 is positioned in front of the tee 18. The ball camera 22 is positioned and mounted to the side surface of the base plate 16. The club camera 20 and the ball camera 22, which are directed toward the golf ball 36, are disposed so that the club camera 20 and the ball camera 22 enable photographing.

The first sensor S1 is a light emitting/receiving sensor. The first sensor S1 includes a light emitter S1a and a light receiver S1b. The light emitter S1a is disposed on one side surface of the base plate 16. The light receiver S1b is disposed on the other side surface of the base plate 16 with the base plate 16 interposed between the light emitter S1a and the light receiver S1b. The light receiver S1b is disposed in the back of the golf player's feet.

The second sensor S2 is a light emitting/receiving sensor. The second sensor S2 includes a light emitter S2a and a light receiver S2b. The light emitter S2a is disposed on one side surface of the base plate 16. The light receiver S2b is disposed on the other side surface of the base plate 16. The light receiver S2b is disposed in the back of the player's feet.

The third sensor S3 is a light emitting/receiving sensor. The third sensor S3 includes a light emitter S3a and a light receiver S3b. The light emitter S3a is disposed on one side surface of the base plate 16. The light receiver S3b is disposed on the other side surface of the base plate 16. The light receiver S3b is disposed in the back of the player's feet.

The first sensor S1 is disposed in the back (on the right side of the position of the ball viewed from the right-handed player) of the position of the ball. The second sensor S2 is disposed in the back of the position of the ball. The third sensor S3 is disposed in the back of the position of the ball.

The second sensor S2 is disposed in the back of the first sensor S1. The third sensor S3 is disposed in the back of the second sensor S2.

The other sensors may be further provided. The measuring apparatus 10 may have four or more sensors.

In a downswing, the head 34a or the shaft 34b of the golf club 34 crosses between the light emitter S3a and the light receiver S3b. Then, the head 34a or the shaft 34b crosses between the light emitter S2a and the light receiver S2b. Then, the head 34a or the shaft 34b crosses between the light emitter S1a and the light receiver S1b. Then, the head 34a or the shaft 34b reaches an impact. That is, in the downswing, the club 34 is detected by the third sensor S3. Thereafter, the club 34 is detected by the second sensor S2. Thereafter, the club 34 is detected by the first sensor S1.

The strobe light 28 (28a, 28b) is mounted to the center part in the vertical direction of the support rod 14. The strobe light 28 is disposed below the club camera 20. The control part 30 is mounted to the base 12.

Figure 2:
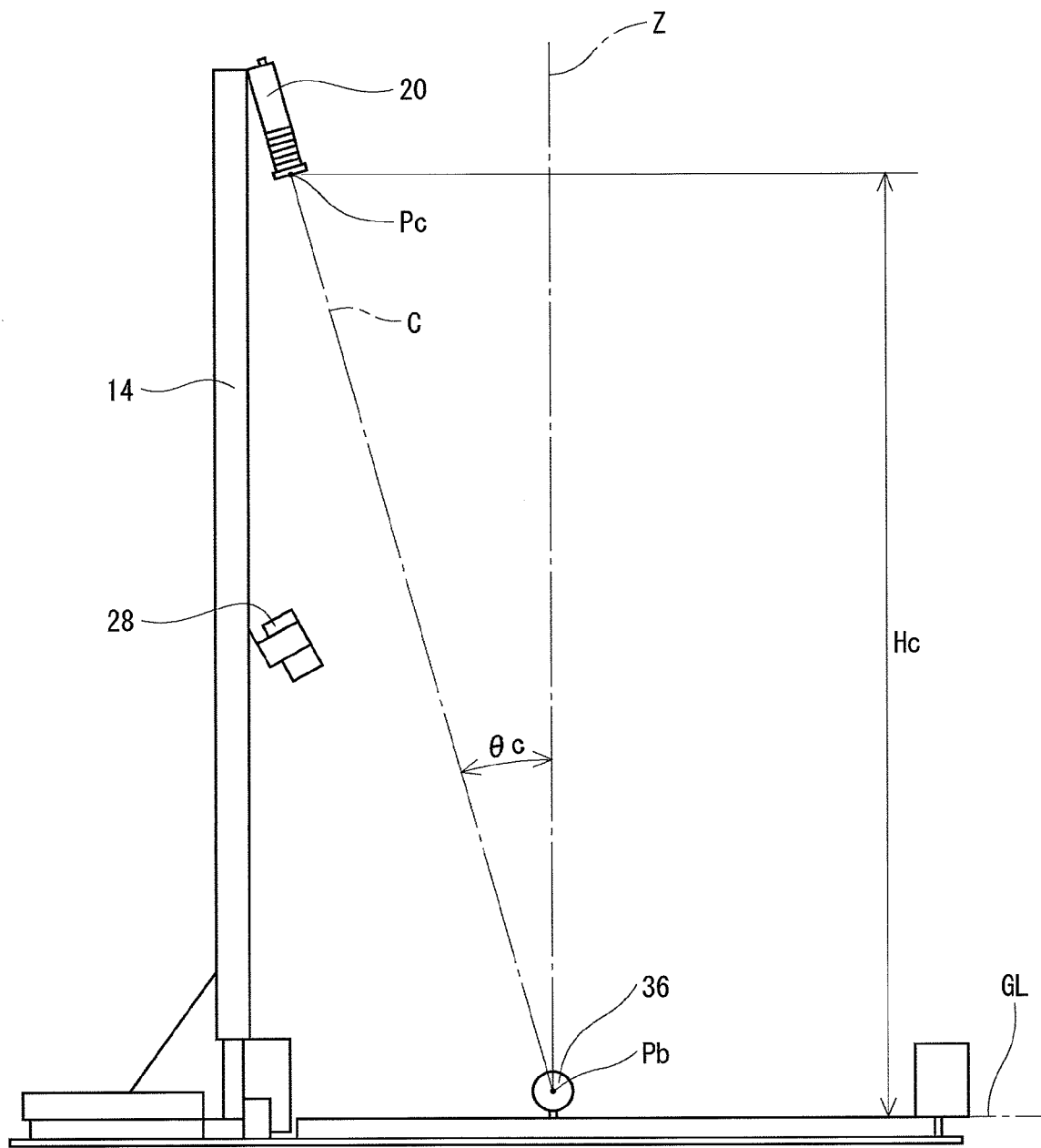
FIG. 2 is a front view of the measuring apparatus of FIG. 1.

A point Pb shown in FIG. 2 shows a central point of a ball 36. A point Pc shows a central point of a lens of the club camera 20. A straight line GL shows a ground level on which the golf player stands. A one-dotted chain line Z shows a perpendicular line passing through the center point Pb in the vertical direction. A one-dotted chain line C shows a straight line passing through the center point Pb and the center point Pc. An angle $\theta c$ shows a crossing angle between the perpendicular line Z and the straight line C. A double-headed arrow Hc shows a height between the ground level and the center point Pc. In the embodiment, the height Hc is 1.1 m, and the angle $\theta c$ is 15 degrees. In respect of obtaining a head image which is advantageous to measure a head moving distance Dh to be described later, the height Hc is preferably 0.9 m or greater and 1.2 m or less. The angle $\theta c$ is preferably 70 degrees or greater and 90 degrees or less.

Although not shown in the drawings, the control part 30 is connected to the club camera 20, the ball camera 22, the first sensor S1, the second sensor S2, the third sensor S3, the strobe light 28, the strobe light 29, and the information processing part 32. The control part 30 can transmit a photographing start signal to the club camera 20 and the ball camera 22. The control part 30 can receive an image signal photographed from the club camera 20 and the ball camera 22. The control part 30 can receive a detection signal of the head 34a or the shaft 34b from the sensors S1, S2, and S3. The control part 30 can transmit a light emitting start signal to the strobe lights 28 and 29.

Although not shown in the drawings, the information processing part 32 includes a monitor as an output part, an interface board as a data input part, a memory, a CPU, and a hard disk. The information processing part 32 may include a keyboard and a mouse. A general-purpose computer may be used as it is as the information processing part 32.

The hard disk stores programs. The memory, which is rewritable, includes a storing area and a working area for programs and various data called from the hard disk. The CPU can read the programs stored in the hard disk. The CPU can execute the programs in the working area of the memory. The CPU can execute various processes according to the programs.

Club image data can be input into the interface board. Furthermore, the club image data, ball image data, and synchronous data of the two image data can be input into the interface board. These input data are output to the CPU. The CPU executes various processes, and outputs predetermined data of a club behavior value, a ball behavior value, and a calculated value calculated from these behavior values to the monitor. The predetermined data is stored in the hard disk.

Figure 3:
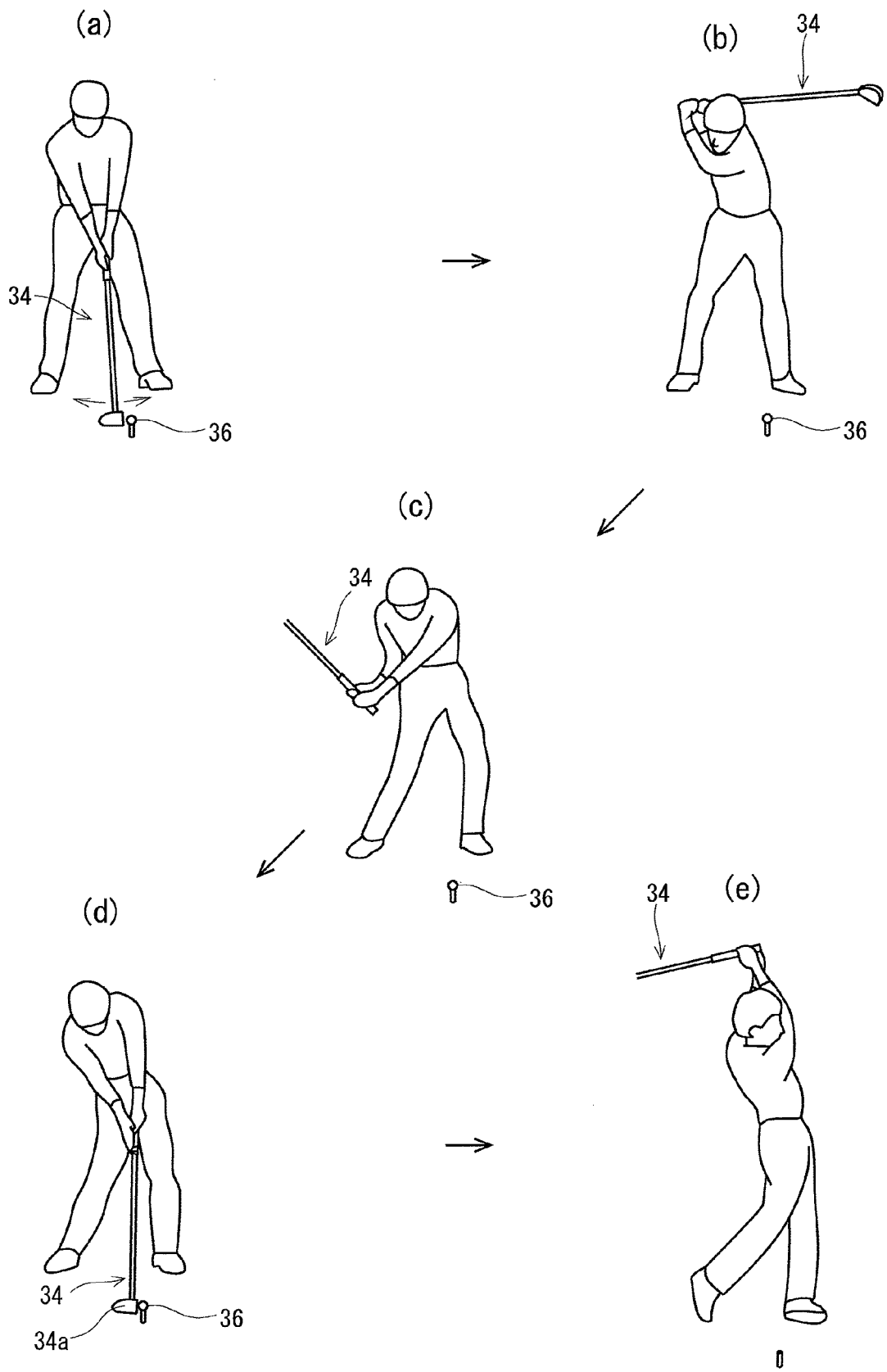
FIG. 3 describes a swing position.

FIG. 3 shows positions of the golf player swinging the golf club 34. The position of FIG. 3(a) is an address. The position of FIG. 3(b) is a top-of-swing (hereinafter, referred to as a top). The position of FIG. 3(d) is an impact. The impact is a position at a moment of collision of the head 34a and the golf ball 36. The position of FIG. 3(c) is a downswing leading to the impact from the top. The position of FIG. 3(e) is a finish. The swing of the player continuously shifts from the address to the top, from the top to the impact through the downswing, and from the impact to the finish. The swing is ended in the finish.

Figure 4:
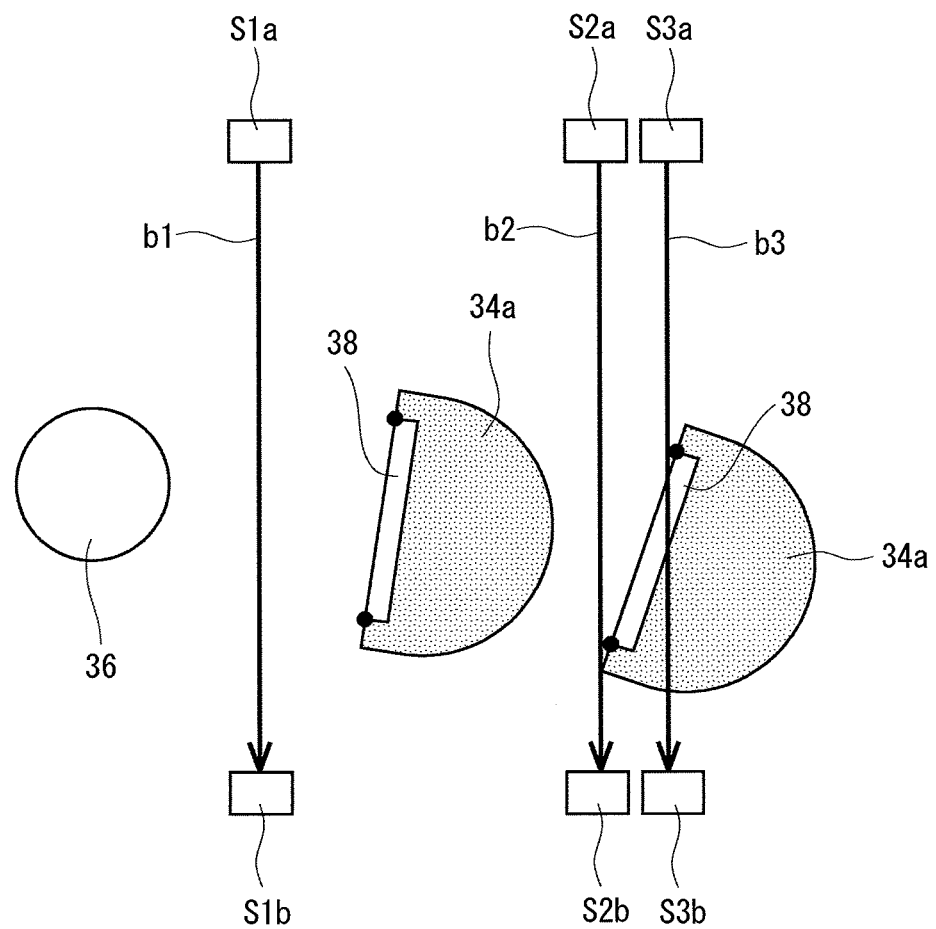
FIG. 4 is a plan view showing positions of three sensors and directions of emitted lights of the sensors in the measuring apparatus of FIG. 1.

FIG. 4 shows a positional relationship between the ball 36 and the sensors S1, S2, S3. In the first sensor S1, a light beam b1 is emitted from the light emitter S1a, and leads to the light receiver S1b. In the second sensor S2, a light beam b2 is emitted from light emitter S2a, and leads to the light receiver S2b. In the third sensor S3, a light beam b3 is emitted from light emitter S1a, and leads to the light receiver S3b. In the drawings (FIG. 4 or the like) of the present application, the light beams b1, b2, and b3 are shown by a thick line. The light beams b1, b2, and b3 are illustrated as arrows so that directions of emitted lights are understood. As shown in FIG. 4 or the like, the three sensors are the first sensor S1, the second sensor S2, and the third sensor S3 in this order from a point close to the ball 36. The first sensor S1 and the second sensor S2 are adjacent to each other. The second sensor S2 and the third sensor S3 are adjacent to each other.

Preferably, laser light beams are used for the light beams b1, b2, and b3.

When the light beam b1 is interrupted, the first sensor S1 detects passage of the head 34a (or the shaft 34b). When the light beam b2 is interrupted, the second sensor S2 detects passage of the head 34a (or the shaft 34b). When the light beam b3 is interrupted, the third sensor S3 detects passage of the head 34a (or the shaft 34b).

The first sensor S1 and the second sensor S2 are used to measure a head speed. The second sensor S2 and the third sensor S3 are used to generate a trigger signal. Therefore, the second sensor S2 is used for two objects. That is, the second sensor S2 is used to measure the head speed, and is also used to generate the trigger signal. Therefore, the number of the sensors is suppressed.

The measuring apparatus 10 has the two sensors S2 and S3 for generating the trigger signal. The second sensor S2 and the third sensor S3 function as sensors for generating the trigger signal. The measuring apparatus 10 comes into a measurement state in accordance with the trigger signal. When the measuring apparatus 10 comes into the measurement state, the control part 30 sets the first sensor S1 to a detectable state. Thus, when the head speed calculated based on the second sensor S2 and the third sensor S3 is equal to or greater than a predetermined threshold value, the measuring apparatus 10 generates the trigger signal.

A time at which the club 34 (head 34a) is detected by the first sensor S1 is defined as T1; a time at which the club 34 (head 34a) is detected by the second sensor S2 is defined as T2; and a time at which the club 34 (head 34a) is detected by the third sensor S3 is defined as T3. In this time, when a club speed (head speed) calculated based on the time T2 and the time T3 is equal to or greater than a predetermined threshold value, the control part 30 transmits a trigger signal for starting photographing (measurement).

In swing measurement, the golfer performs an address. In the address, many golfers perform a waggle. The club (the head and the shaft) is moved by the waggle (see FIG. 4). Even when the golfers do not perform the waggle, the club is moved to an address state in a preparation stage for the address. At this time, the club is moved to an address position from the outside of a measurement region. In the conventional technique, the trigger signal was sometimes erroneously generated due to the motion of the club. On the other hand, in the embodiment, the trigger signal is not generated at a moving speed of less than the threshold value by setting the threshold value. Therefore, the erroneous generation of the trigger signal is suppressed. In the embodiment, the automation of the trigger signal can be accurately achieved.

Conventionally, for example, the trigger signal was manually generated to prevent the erroneous generation of the trigger signal. Specifically, for example, a measurer pushed a switch for generating the trigger signal at a timing at which the swing was near the top. In the embodiment, the manually generated trigger signal can be unrequired. Therefore, simplification of measurement working, reduction of a measurement error, and improvement in a measurement speed can be achieved.

In respect of suppressing the erroneous generation of the trigger signal, the threshold value is preferably equal to or greater than 5 m/s, more preferably equal to or greater than 8 m/s, and still more preferably equal to or greater than 10 m/s. When the head speed at the time of normal measurement is considered, the threshold value is preferably equal to or less than 15 m/s, and more preferably equal to or less than 12 m/s. However, the threshold value can be adjusted to a proper value for every golfer. For example, the threshold value can be highly set for a golfer having a quick motion of the head in the waggle. The threshold value can be highly set also for a golfer having a high head speed.

The measuring apparatus 10 comes into the measurement state in response to the transmission of the trigger signal. In the measurement state, the head 34a (or the shaft 34b) interrupts the light beam b2. Then, the head 34a (or the shaft 34b) interrupts the light beam b1. That is, in the measurement state, the head 34a (or the shaft 34b) is detected by the second sensor S2. Then, the head 34a (or the shaft 34b) is detected by the first sensor S1. The measuring apparatus 10 calculates the head speed based on these detection results. The head speed is calculated by the information processing part 32.

The head may be moved to a direction opposite to the downswing during the waggle. The head is moved to the direction opposite to the downswing during a backswing. In this case, the head may be moved to the third sensor S3 from the second sensor S2. The trigger signal is not generated at even any head speed in a motion in the direction opposite to the downswing (a motion in the backswing direction). The speed in the threshold value is a speed in the downswing direction. In other words, when a speed in the backswing direction is defined as minus, and the speed in the downswing direction is defined as plus, the speed of the threshold value is plus.

Figure 5:
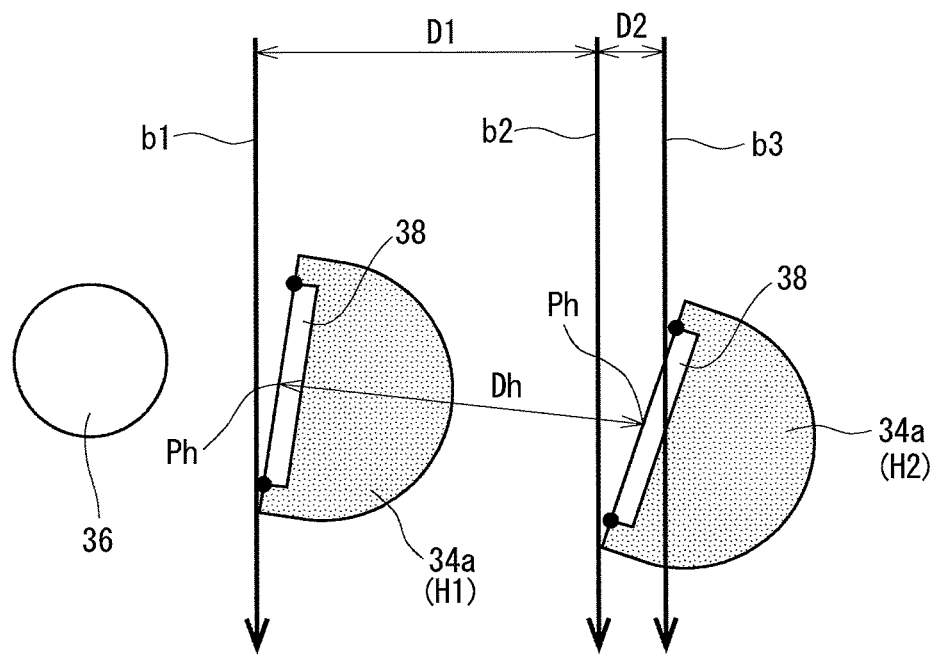
FIG. 5 is a diagram for describing a head moving distance.

A distance between the detection position of the first sensor S1 (light beam b1) and the detection position of the second sensor S2 (light beam b2) is shown by a double-headed arrow D1 in FIG. 5. Conventionally, the head speed was calculated based on the distance D1. However, it was found that accuracy may be reduced in the calculating method.

When the club 34 passes the sensors S1 and S2, any portion of the club 34 interrupts the light beams b1 and b2. Hereinafter, the portion interrupting the light beam is also referred to as an interrupting portion. The interrupting portion may be the head 34a or the shaft 34b. The interrupting portion may be a hosel of the head 34a, a heel of the head 34a, or a toe of the head 34a. The interrupting portion may be a crown of the head 34a or a sole of the head 34a. That is, the interrupting portion is not necessarily constant.

There are great differences between individuals in the swings of the golfers. For example, the trajectory of the head is different depending on the golfers. Some golfers have an outside-in swing path, and others have an inside-out swing path. Some golfers have an upper blow swing path, and others have a down blow swing path. The difference between the swing paths may cause the fluctuation of the interrupting portion. For example, in a golfer having strong tendency of the down blow, not the head but the shaft may be likely to be detected by the sensor. The posture of the head near the impact is also different depending on the golfers. Although the heel end of the head 34a is the interrupting portion in FIG. 5, the interrupting portion is located on the toe side of the head in some golfers, or the interrupting portion is located at the center of the head in other golfers. The interrupting portion may be a crown or a sole in some golfers. The diversity of the interrupting portion may bring about a measurement error. For example, when the interrupting portion in the second sensor S2 is different from the interrupting portion in the first sensor S1, the conventional head speed based on the distance D1 is apt to bring about an error.

Therefore, in the embodiment, the head speed is calculated based on not the distance D1 but the head moving distance Dh.

As shown in FIG. 5, the head image at the time T1 is defined as H1, and the head image at the time T2 is defined as H2. The distance Dh is a head moving distance obtained from the image H1 and the image H2.

The head speed is calculated based on the head moving distance Dh. That is, when a time period between the time T2 and the time T1 is defined as T12, the head speed is calculated based on the head moving distance Dh and the time T12. An example of a calculation formula of the head speed is Dh/T12.

In respect of accuracy, the head moving distance Dh is preferably measured at a reference position Ph on the head. In respect of clarifying the position Ph, a mark 38 is preferably provided on the head 34a. The mark 38 is provided at a position where the mark 38 can be photographed in the head image. When the head 34a has the crown, the mark 38 is preferably provided on the crown. In the embodiment, the mark 38 is an elongated tape. In the embodiment, the central position in the longitudinal direction of the mark 38 is defined as the reference position Ph (see FIG. 5). The number of the marks 38 may be one or plural. For example, the plurality of point-like marks 38 may be used. Examples of the shape of the point-like mark 38 include a circular form and a rectangle. For example, the mark 38 may be provided on both the toe side and the heel side. In this case, a middle point of a line segment connecting the marks 38 may be the reference position Ph.

Figure 6:
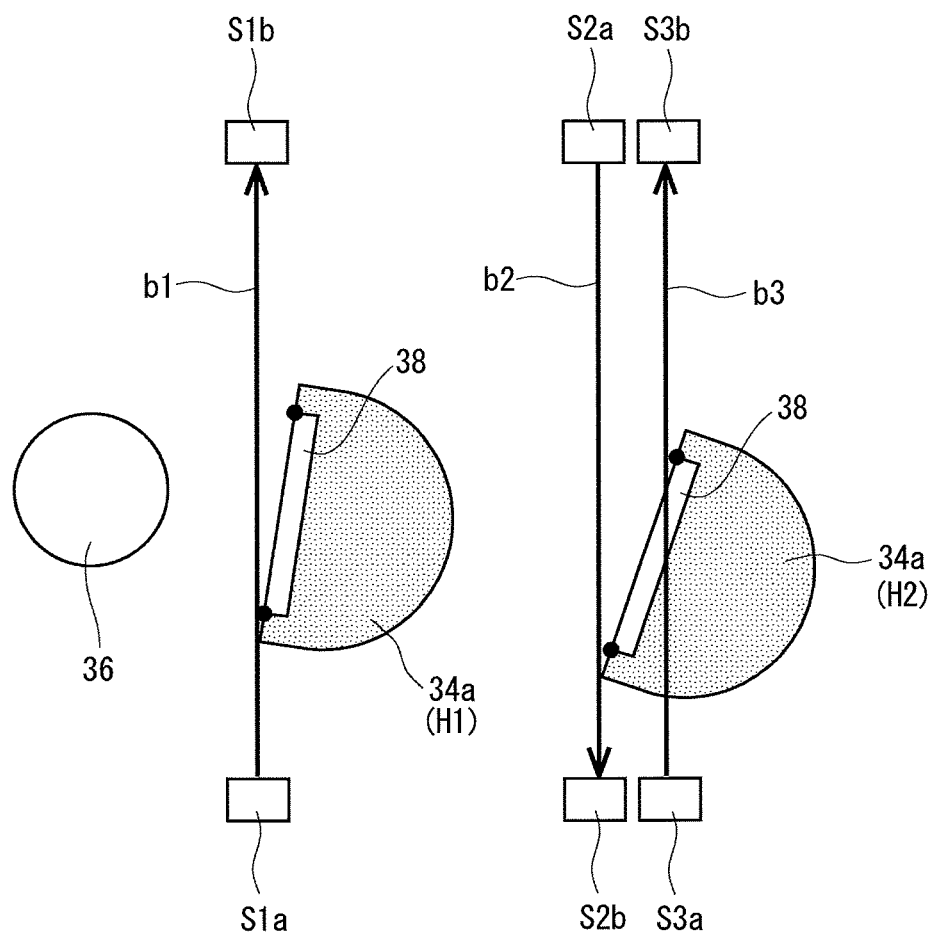
FIG. 6 is a plan view showing positions of three sensors and directions of emitted lights of the sensors in a measuring apparatus of a second embodiment.

FIG. 6 shows directions of light beams b1, b2, and b3 in a measuring apparatus of a second embodiment. Different points from the measuring apparatus 10 of the first embodiment are only directions of emitted lights of the light beam b1 and the light beam b3.

As shown in FIG. 6, in the embodiment, directions of emitted lights of a first sensor S1 and a second sensor S2 are opposite to each other. Directions of emitted lights of the second sensor S2 and a third sensor S3 are opposite to each other.

Figure 7:
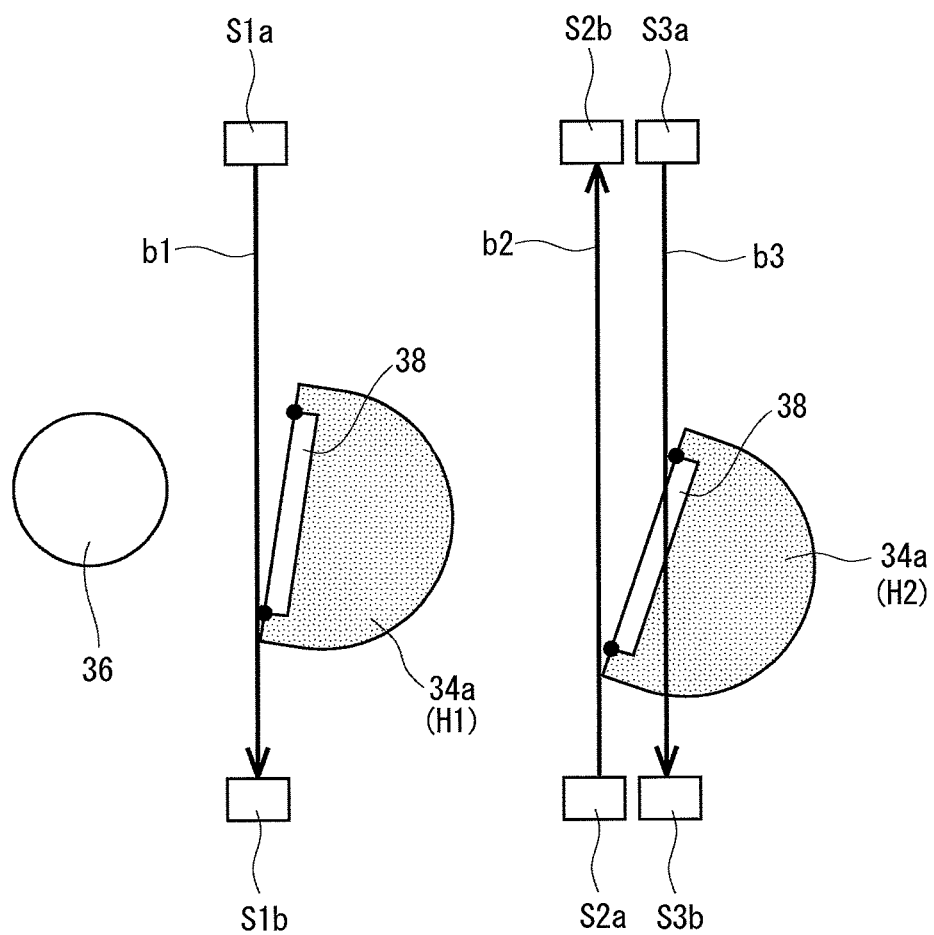
FIG. 7 is a plan view showing positions of three sensors and directions of emitted lights of the sensors in a measuring apparatus of a third embodiment.

FIG. 7 shows directions of light beams b1, b2, and b3 in a measuring apparatus of a third embodiment. A different point from the measuring apparatus 10 of the first embodiment is only a direction of emitted light of the light beam b2. As compared with the embodiment of FIG. 6, the directions of the emitted lights of all the light beams b1, b2, and b3 are opposite in the embodiment of FIG. 7.

Even in the embodiment of FIG. 7, directions of emitted lights of a first sensor S1 and a second sensor S2 are opposite to each other. Directions of emitted lights of the second sensor S2 and a third sensor S3 are opposite to each other.

As shown in the embodiments of FIGS. 6 and 7, it was found that the malfunction of the sensor can be prevented by reversing the directions of the emitted lights of the adjacent sensors.

When light emitted from a certain sensor is received by another sensor, the malfunction of the sensor is generated. For example, when light emitted from a light emitter S2a of the second sensor S2 is received by a light receiver S1b of the third sensor S3, the malfunction of the sensors is generated. The malfunction can be prevented by reversing the directions of the emitted lights of the adjacent sensors.

When the sensors are close to each other, the malfunction is apt to be generated. Therefore, the directions of the emitted lights of at least the two sensors between which an interval is narrower in the three sensors are preferably opposite to each other.

Hereinafter, a use example of the swing measuring apparatus 10 will be described. In the use example, a tape 38 as a mark is applied on a head 34a of a golf club 34. The longitudinal direction of the tape 38 is applied in parallel with a face surface of the golf club 34. A golf ball 36 is set on a tee 18. The golf player has the golf club 34, and performs an address.

The threshold value is set so that a trigger signal is not generated even when the player performs a waggle in the address. Although the head may be also moved by preparation for the address, or the like, the threshold value is set so that the trigger signal is not generated also by the motion of the head.

The golf player starts to swing the golf club 34. In a process from the downswing to the impact, the third sensor S3 and the second sensor S2 detect the club 34. A club speed (head speed or the like) is measured based on these detections. When the measurement value is equal to or greater than the threshold value, the control part 30 transmits the trigger signal, and the measuring apparatus 10 shifts to a measurement state.

The detection signal of the club 34 in the second sensor S2 is output to the control part 30. The control part 30 outputs a light emitting start signal to a strobe light 28a at a time T2 at which the control part 30 receives the detection signal. The strobe light 28a emits light in response to the signal. A head image H2 at the time T2 is obtained by the light emission.

Next, the first sensor S1 detects the golf club 34. The detection signal of the first sensor S1 is output to the control part 30. The control part 30 outputs a light emitting start signal to a strobe light 28b at a time T1 at which the control part 30 receives the detection signal. The strobe light 28b emits light in response to the signal. A head image H1 at the time T1 is obtained by the emitted light.

A club camera 20 photographs the behavior of the golf club 34. The club camera 20 includes a multishutter. The club camera 20 enables high-speed continuous photographing at predetermined intervals in a photographing range. Two or more image signals are obtained by the continuous photographing. These image signals include a signal of the head image H1 and a signal of the head image H2.

A head moving distance Dh is measured from the signal of the head image H1 and the head image H2. As described above, the head speed is calculated from the head moving distance Dh and the time T12.

A ball camera 22 photographs the behavior of a golf ball 36. The ball camera 22 includes a multishutter. The ball camera 22 performs high-speed continuous photographing at a predetermined time period interval. Image data at a plurality of moments is obtained by the continuous photographing. An information processing part 32 calculates a predetermined behavior value of a ball from ball image data. Herein, for example, values of a ball speed, a launch angle, a deflection angle, a backspin speed, and a side spin speed are calculated. The spin speed and the launch angle or the like can be calculated using these images. Although not shown in the drawings, a plurality of points is applied to the surface of the golf ball 36. The backspin speed and the side spin speed can be accurately measured based on the movement amounts of the positions of the two points of the points. The spin speed is calculated from the position of the golf ball 36 and the time period interval for photographing.

The control part 30 outputs time data, club image data, and ball image data to the information processing part 32. The information processing part 32 calculates a predetermined behavior value of the club from the club image data. As described above, an example of the club behavior value includes the head speed.

The calculated club behavior value and ball behavior value are stored with the time data in the information processing part 32. The information processing part 32 displays a predetermined behavior value on a monitor from the club behavior value and the ball behavior value.

As described above, a distance between the detection position of the first sensor S1 (light beam b1) and the detection position of the second sensor S2 (light beam b2) is shown by a double-headed arrow D1 in FIG. 5. In respect of the measurement accuracy of the head trajectory, the distance D1 is preferably equal to or greater than 80 mm, and more preferably equal to or greater than 90 mm. In respect of measuring the club behavior immediately before the impact, the distance D1 is preferably equal to or less than 120 mm, and more preferably equal to or less than 110 mm.

A distance between the detection position of the second sensor S2 (light beam b2) and the detection position of the third sensor S3 (light beam b3) is shown by a double-headed arrow D2 in FIG. 5. In respect of the measurement accuracy of the head speed (threshold value), the distance D2 is preferably equal to or greater than 10 mm, and more preferably equal to or greater than 15 mm. In respect of downsizing the apparatus, the distance D2 is preferably equal to or less than 30 mm, and more preferably equal to or less than 25 mm.

When preferred values of the distance D1 and the distance D2 are considered, D2/D1 is preferably equal to or greater than 0.08, and more preferably equal to or greater than 0.13. When preferred values of the distance D1 and the distance D2 are considered, D2/D1 is preferably equal to or less than 0.38, and more preferably equal to or less than 0.25.

When preferred values of the distance D1 and the distance D2 are considered, the distance D2 is preferably smaller than the distance D1. Since the distance D2 is comparatively small, the light beam b2 is likely to be received by the light receiver S3b, and the light beam b3 is likely to be received by the light receiver S2b. In this respect, particularly, the directions of the emitted lights of the second sensor S2 and the third sensor S3 of the three sensors are preferably opposite to each other.

The method described above can be used to measure all clubs such as a wood type club, an iron type club, and a hybrid type club.

The description hereinabove is merely for an illustrative example, and various modifications can be made in the scope not to depart from the principles of the present invention.

What is claimed is:

1. A measuring apparatus for a golf club comprising:
   a club camera capable of photographing the golf club;
   a control part capable of controlling a timing at which the golf club is photographed; and
   three sensors capable of detecting passage of the golf club,
   wherein the three sensors are a first sensor, a second sensor, and a third sensor, and when a club speed calculated based on the passage of the golf club detected by the second sensor and the third sensor is equal to or greater than a predetermined threshold value, the control part generates a trigger signal for starting to photograph the golf club,
   wherein the first sensor, second sensor and third sensor are positioned on one side of a launch position of a golf ball in a direction opposite to a launch direction of the golf ball,
   wherein the second sensor is located further from the launch position in the direction opposite to the launch direction than the first sensor, and
   wherein the third sensor is located further from the launch position in the direction opposite to the launch direction than the second sensor.

2. The measuring apparatus according to claim 1, wherein a head moving distance Dh is calculated based on a head position when the second sensor detects the passage of the golf club and a head position when the first sensor detects the passage of the golf club; and a head speed is calculated based on the head moving distance Dh.

3. The measuring apparatus according to claim 1, further comprising an information processing part capable of calculating a head speed, wherein
   when a time at which the club is detected by the second sensor is defined as T2;
   a time at which the club is detected by the first sensor is defined as T1;
   a time period between the time T2 and the time T1 is defined as T12;
   a head image at the time T1 is defined as H1;
   a head image at the time T2 is defined as H2; and
   a head moving distance obtained from the image H1 and the image H2 is defined as Dh,
   the information processing part calculates the head speed based on the head moving distance Dh and the time T12.

4. The measuring apparatus according to claim 1, wherein at least two sensors which are adjacent to each other in the three sensors are light emitting/receiving sensors; and directions of emitted lights of the two sensors are opposite to each other.

5. The measuring apparatus according to claim 4, wherein the two light emitting/receiving sensors are the second sensor and the third sensor.

6. The measuring apparatus according to claim 1, wherein the three sensors are light emitting/receiving sensors;
   directions of emitted lights of the first sensor and the second sensor are opposite to each other; and
   directions of emitted lights of the second sensor and the third sensor are opposite to each other.

7. The measuring apparatus according to claim 1, wherein the threshold value is 5 m/s or greater and 15 m/s or less.

8. The measuring apparatus according to claim 2, wherein when a club having a mark provided on a crown of a head is used, the head moving distance Dh can be measured based on the mark.

9. The measuring apparatus according to claim 1, wherein when a distance between a detection position of the first sensor and a detection position of the second sensor is defined as D1, the distance D1 is 80 mm or greater and 120 mm or less.

10. The measuring apparatus according to claim 1, wherein when a distance between a detection position of the second sensor and a detection position of the third sensor is defined as D2, the distance D2 is 10 mm or greater and 30 mm or less.

11. The measuring apparatus according to claim 1, wherein when a distance between a detection position of the first sensor and a detection position of the second sensor is defined as D1 and a distance between the detection position of the second sensor and a detection position of the third sensor is defined as D2, the distance D2 is less than the distance D1.

12. The measuring apparatus according to claim 11, wherein D2/D1 is 0.08 or greater and 0.38 or less.

13. The measuring apparatus according to claim 1, wherein when a straight line passing through a center point of a hit ball and a center point of a lens of the club camera is defined as a straight line C, an angle θc between the straight line C and a vertical line Z is 70 degrees or greater and 90 degrees or less.

14. The measuring apparatus according to claim 1, wherein when a height between a ground level and a center point of a lens of the club camera is defined as Hc, the height Hc is 0.9 m or greater and 1.2 m or less.

* * * * *